(12) United States Patent
Kim et al.

(10) Patent No.: US 12,454,188 B2
(45) Date of Patent: Oct. 28, 2025

(54) WIRELESS CHARGING DEVICE, AND TRANSPORTATION MEANS COMPRISING SAME

(71) Applicant: SKC CO., LTD., Gyeonggi-do (KR)

(72) Inventors: Tae Kyoung Kim, Gyeonggi-do (KR);
Nah Young Kim, Gyeonggi-do (KR);
Jong Hak Choi, Gyeonggi-do (KR);
Seunghwan Lee, Gyeonggi-do (KR)

(73) Assignee: SKC CO., LTD., Gyeonggi-do (KR)

(*) Notice: Subject to any disclaimer, the term of this patent is extended or adjusted under 35 U.S.C. 154(b) by 773 days.

(21) Appl. No.: 17/777,844

(22) PCT Filed: Nov. 20, 2020

(86) PCT No.: PCT/KR2020/016500
§ 371 (c)(1),
(2) Date: May 18, 2022

(87) PCT Pub. No.: WO2021/101328
PCT Pub. Date: May 27, 2021

(65) Prior Publication Data
US 2022/0410730 A1    Dec. 29, 2022

(30) Foreign Application Priority Data

Nov. 20, 2019 (KR) ........................ 10-2019-0149597

(51) Int. Cl.
*B60L 53/12*    (2019.01)
*B60L 53/302*    (2019.01)
(Continued)

(52) U.S. Cl.
CPC ............. *B60L 53/12* (2019.02); *B60L 53/302* (2019.02); *H01F 27/08* (2013.01); *H01F 27/36* (2013.01);
(Continued)

(58) Field of Classification Search
CPC ........ B60L 53/12; B60L 53/302; H01F 27/08; H01F 27/36; H01F 27/025; H01F 27/22;
(Continued)

(56) References Cited

U.S. PATENT DOCUMENTS

2010/0084056 A1* 4/2010 Ohta ................. C22C 33/003
148/540
2011/0206933 A1* 8/2011 Kim ..................... C08K 3/08
252/75
(Continued)

FOREIGN PATENT DOCUMENTS

JP    2007142081 A    6/2007
JP    2017054886 A    3/2017
(Continued)

OTHER PUBLICATIONS

Office Action for the Japanese Patent Application No. 2022-527047 issued by the Japanese Patent Office on May 9, 2023.
(Continued)

*Primary Examiner* — Paul Dinh
(74) *Attorney, Agent, or Firm* — IP & T GROUP LLP

(57) ABSTRACT

A wireless charging device according to an embodiment, can effectively discharge heat by including an insulating heat dissipation part in the inner part of a magnetic part or between the magnetic part and a coil part. Therefore, the wireless charging device can be effectively used for a transportation means such as an electric vehicle that requires high-capacity power transmission between a transmitter and a receiver.

6 Claims, 3 Drawing Sheets

(51) Int. Cl.
   *H01F 27/08* (2006.01)
   *H01F 27/36* (2006.01)
   *H02J 50/00* (2016.01)
   *H02J 50/10* (2016.01)
   *H02J 50/70* (2016.01)

(52) U.S. Cl.
   CPC ............ *H02J 50/005* (2020.01); *H02J 50/10* (2016.02); *H02J 50/70* (2016.02)

(58) Field of Classification Search
   CPC ...... H01F 27/361; H01F 38/14; H01F 27/085; H01F 27/324; H02J 50/005; H02J 50/10; H02J 50/70; Y02T 10/70; Y02T 10/7072
   USPC .......................................................... 320/108
   See application file for complete search history.

(56) References Cited

U.S. PATENT DOCUMENTS

| | | | |
|---|---|---|---|
| 2013/0294557 A1* | 11/2013 | Perkins | G21G 4/02 376/115 |
| 2014/0048115 A1* | 2/2014 | Kirihara | G06F 3/041 136/229 |
| 2015/0114952 A1* | 4/2015 | Tai | H05B 3/84 977/932 |
| 2015/0255993 A1* | 9/2015 | Kuerschner | H01F 38/14 307/104 |
| 2016/0276079 A1 | 9/2016 | Nishimoto et al. | |
| 2017/0253129 A1* | 9/2017 | Garcia | H01F 27/10 |
| 2018/0254136 A1 | 9/2018 | Ueda et al. | |
| 2020/0198483 A1* | 6/2020 | Laemmle | H01F 27/363 |
| 2022/0205071 A1* | 6/2022 | Men | C22C 33/06 |

FOREIGN PATENT DOCUMENTS

| | | |
|---|---|---|
| JP | 2019-165096 A | 9/2019 |
| KR | 10-2011-0042403 A | 4/2011 |
| KR | 10-2017-0072712 A | 6/2017 |
| KR | 10-2017-0076510 A | 7/2017 |
| KR | 10-2017-0081411 A | 7/2017 |
| KR | 20170081411 A | 7/2017 |
| KR | 10-2017-0130230 A | 11/2017 |
| KR | 10-2018-0063768 A | 6/2018 |
| KR | 20180063768 A | 6/2018 |
| WO | 2015064694 A1 | 5/2015 |
| WO | 2018197267 A1 | 11/2018 |

OTHER PUBLICATIONS

Extended European Search Report on the European Patent application No. 20890190.0 issued by the European Patent Office on Nov. 28, 2023.

Office Action on the Japanese Patent Application No. 2022-527047 issued by the Japanese Patent Office on Nov. 21, 2023.

Office Action for the Korean Patent Application No. 10-2019-0149597 issued by the Korean Intellectual Property Office on Mar. 20, 2024.

* cited by examiner

[Fig. 1]
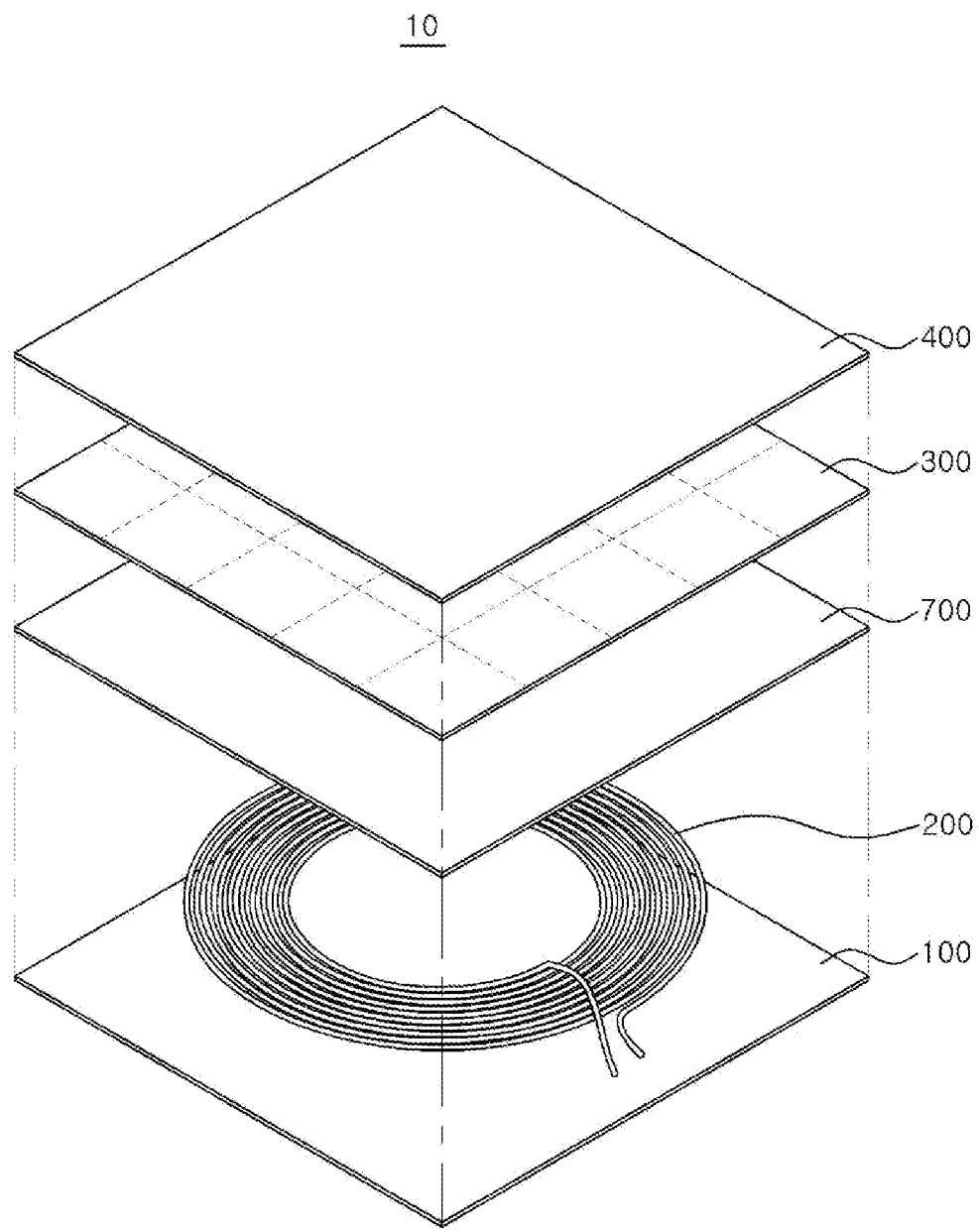

[Fig. 2a]
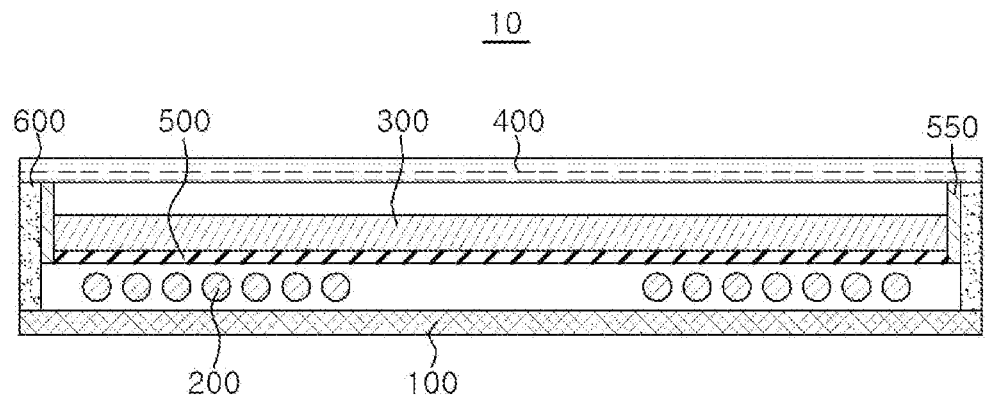
[Fig. 2b]
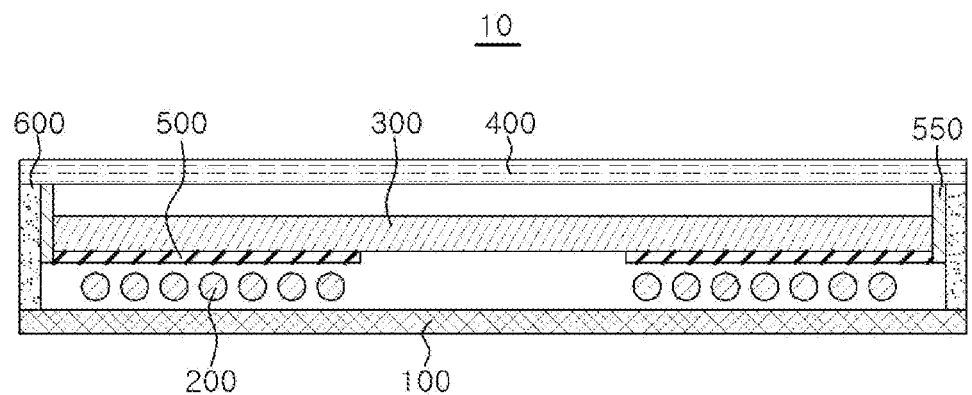
[Fig. 2c]
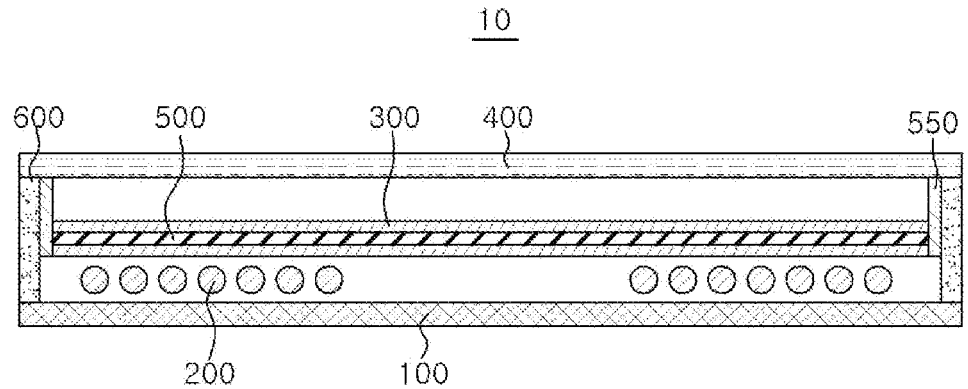

[Fig. 3]
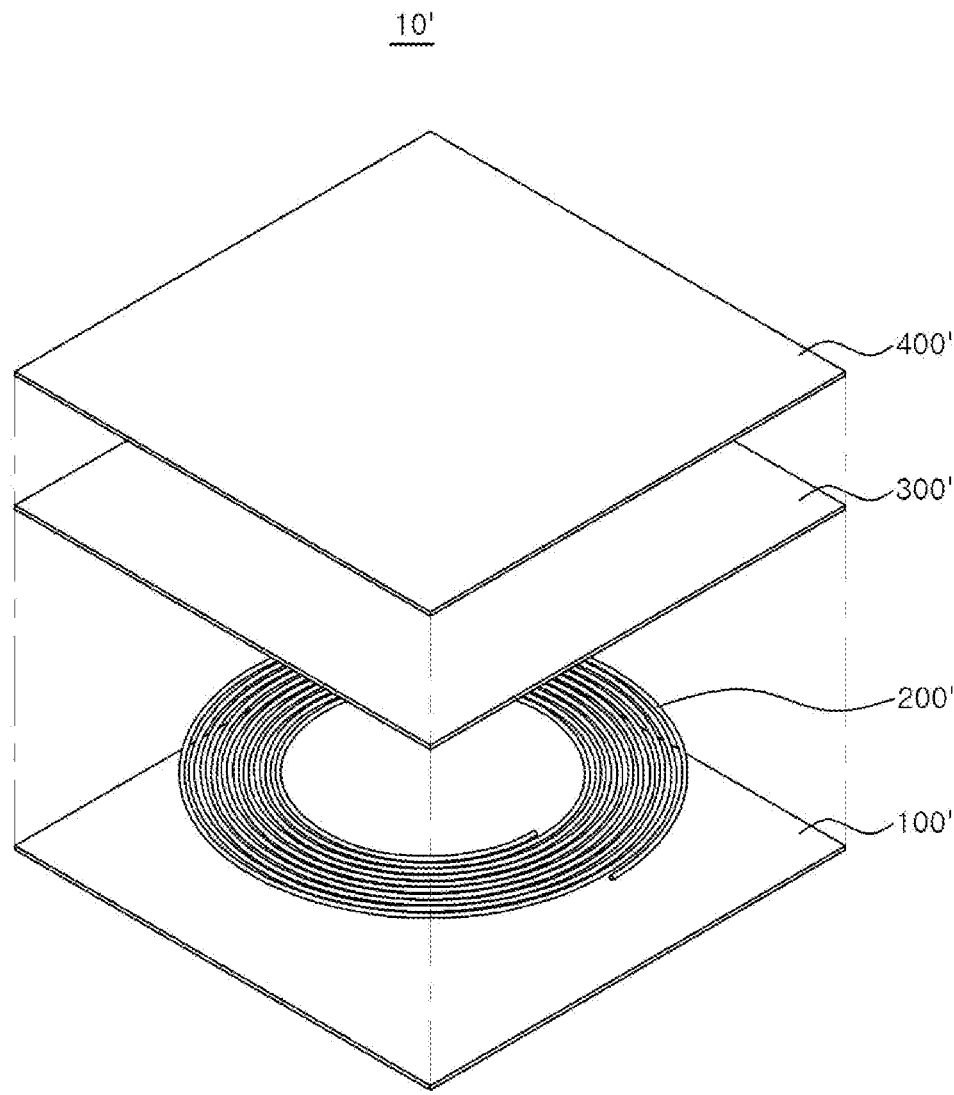
[Fig. 4]
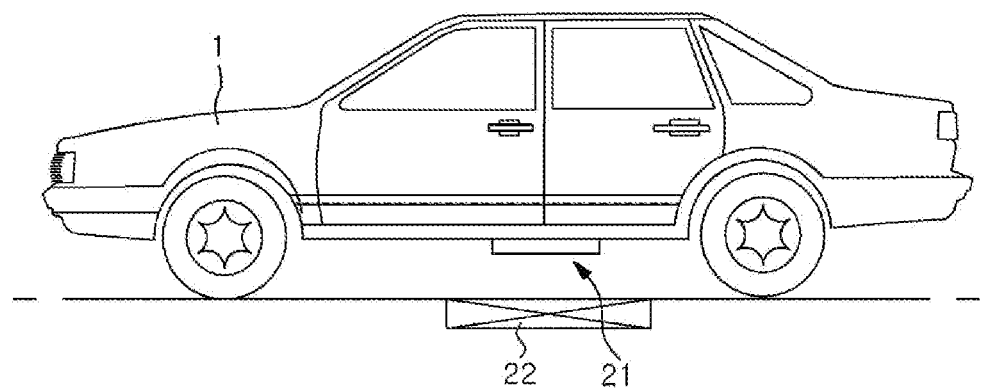

WIRELESS CHARGING DEVICE, AND TRANSPORTATION MEANS COMPRISING SAME

This application is a national stage application of PCT/KR2020/016500 filed on Nov. 20, 2020, which claims priority of Korean patent application number 10-2019-0149597 filed on Nov. 20, 2019. The disclosure of each of the foregoing application is incorporated herein by reference in its entirety.

TECHNICAL FIELD

Embodiments relate to a wireless charging device and to a transportation means comprising the same. More specifically, the embodiments relate to a wireless charging device with enhanced charging efficiency through a heat dissipation structure and to a transportation means comprising the same such as an electric vehicle.

BACKGROUND ART

In recent years, the information and communication field is being developed at a very fast pace, and various technologies that comprehensively combine electricity, electronics, communication, and semiconductor are continuously being developed. In addition, as electronic devices tend to be more mobile, research on wireless communication and wireless power transmission technologies is being actively conducted in the communication field. In particular, research on a method for wirelessly transmitting power to electronic devices is being actively conducted.

The wireless power transmission refers to wirelessly transmitting power through space using inductive coupling, capacitive coupling, or an electromagnetic field resonance structure such as an antenna without physical contact between a transmitter that supplies power and a receiver that receives power. The wireless power transmission is suitable for portable communication devices, electric vehicles, and the like that require a large-capacity battery. Since the contacts are not exposed, there is little risk of a short circuit, and a charging failure phenomenon in a wired method can be prevented.

Meanwhile, as interest in electric vehicles has rapidly increased in recent years, interest in building charging infrastructure is increasing. Various charging methods have already appeared, such as electric vehicle charging using home chargers, battery replacement, rapid charging devices, and wireless charging devices. A new charging business model has also begun to appear (see Korean Laid-open Patent Publication No. 2011-0042403). In addition, electric vehicles and charging stations that are being tested begin to stand out in Europe. In Japan, electric vehicles and charging stations are being piloted, led by automakers and power companies.

PRIOR ART DOCUMENT (Patent Document 1) Korean Laid-open Patent Publication No. 2011-0042403

DISCLOSURE OF INVENTION

Technical Problem

In the conventional wireless charging device used for electric vehicles, referring to FIG. 3, a magnetic unit (300') is disposed adjacent to a coil unit (200') to enhance the wireless charging efficiency, and a shield unit (400') for electromagnetic shielding is disposed to be spaced apart from the magnetic unit (300') by a predetermined interval.

A wireless charging device generates heat due to the resistance of a coil unit and the magnetic loss of a magnetic unit during the wireless charging operation. In particular, the magnetic unit in a wireless charging device generates heat in a part close to the coil unit with a high electromagnetic wave energy density. The generated heat may change the magnetic characteristics of the magnetic unit and cause an impedance mismatch between the transmitter and receiver, which deteriorates the charging efficiency. As a result, the generation of heat is, in turn, aggravated. However, since such a wireless charging device is installed in the lower part of an electric vehicle, a sealed structure is adopted for dustproofing, waterproofing, and shock absorption. Thus, it is difficult to implement a heat dissipation structure.

As a result of research conducted by the present inventors, it has been discovered that if an insulating heat dissipation unit is provided inside the magnetic unit or between the magnetic unit and the coil unit, heat can be readily dissipated.

Accordingly, the problem to be solved by the embodiment is to provide a wireless charging device with effective heat dissipation and a transportation means comprising the same.

Solution to Problem

According to an embodiment, there is provided a wireless charging device, which comprises a coil unit comprising a conductive wire; a shield unit disposed on the coil unit; a magnetic unit disposed between the coil unit and the shield unit; and an insulating heat dissipation unit disposed inside the magnetic unit or between the magnetic unit and the coil unit.

According to another embodiment, there is provided a transportation means, which comprises a wireless charging device, wherein the wireless charging device comprises a housing; a coil unit disposed in the housing and comprising a conductive wire; a shield unit disposed on the coil unit; a magnetic unit disposed between the coil unit and the shield unit; and an insulating heat dissipation unit disposed inside the magnetic unit or between the magnetic unit and the coil unit.

Advantageous Effects of Invention

The wireless charging device according to the embodiment is provided with a heat dissipation unit adjacent to the coil unit or magnetic unit in which heat is generated, whereby heat can be effectively discharged.

Specifically, in the wireless charging device, the heat dissipation unit may be disposed between the magnetic unit and the coil unit to deal with the heat generated in the magnetic unit and the coil unit at the same time, or it may be disposed inside the magnetic unit to effectively deal with the heat generated inside the magnetic unit. In addition, the heat dissipation unit may be connected to the shield unit to effectively dissipate heat to the outside.

Accordingly, the wireless charging device can be advantageously used in a transportation means such as electric vehicles that requires large-capacity power transmission between a transmitter and a receiver.

BRIEF DESCRIPTION OF DRAWINGS

FIG. 1 is an exploded perspective view of a wireless charging device according to an embodiment.

FIGS. 2a to 2c show various examples of a cross-sectional view of a wireless charging device.

FIG. 3 is an exploded perspective view of a conventional wireless charging device.

FIG. 4 shows an electric vehicle provided with a wireless charging device as a receiver.

EXPLANATION OF REFERENCE NUMERALS

| | |
|---|---|
| 1: electric vehicle | 22: transmitter |
| 10: wireless charging device according to an embodiment | 200, 200': coil unit |
| | 400, 400': shield unit |
| 10: wireless charging device of the prior art | 550: thermally conductive medium |
| 21: receiver | |
| 100, 100': support unit | |
| 300, 300': magnetic unit | |
| 500: heat dissipation unit | |
| 600: housing | |

BEST MODE FOR CARRYING OUT THE INVENTION

In the following description of the embodiments, in the case where an element is mentioned to be formed "on" or "under" another element, it means not only that one element is directly formed "on" or "under" another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted, and they may differ from the actual sizes.

Throughout the present specification, when a part is referred to as "comprising" an element, it is understood that other elements may be comprised, rather than other elements are excluded, unless specifically stated otherwise.

In addition, all numbers expressing the characteristics, dimensions, and the like of elements used herein are to be understood as being modified by the term "about" unless otherwise indicated.

In the present specification, a singular expression is understood to encompass a singular or plural expression, interpreted in context, unless otherwise specified.

Wireless Charging Device

FIG. 1 is an exploded perspective view of a wireless charging device according to an embodiment.

Referring to FIG. 1, the wireless charging device (10) according to an embodiment comprises a coil unit (200) comprising a conductive wire; a shield unit (400) disposed on the coil unit (200); a magnetic unit (300) disposed between the coil unit (200) and the shield unit (400); and an insulating heat dissipation unit (500) disposed inside the magnetic unit (300) or between the magnetic unit (300) and the coil unit (200).

Hereinafter, each constitutional element of the wireless charging device will be described in detail.

Coil Unit

The coil unit comprises a conductive wire.

The conductive wire comprises a conductive material. For example, the conductive wire may comprise a conductive metal. Specifically, the conductive wire may comprise at least one metal selected from the group consisting of copper, nickel, gold, silver, zinc, and tin.

In addition, the conductive wire may have an insulating sheath. For example, the insulating sheath may comprise an insulating polymer resin. Specifically, the insulating sheath may comprise a polyvinyl chloride (PVC) resin, a polyethylene (PE) resin, a Teflon resin, a silicone resin, a polyurethane resin, or the like.

The conductive wire may have a diameter of, for example, 1 mm to 10 mm, 1 mm to 5 mm, or 1 mm to 3 mm.

The conductive wire may be wound in the form of a planar coil. Specifically, the planar coil may comprise a planar spiral coil. In addition, the planar shape of the coil may be a circle, an ellipse, a polygon, or a polygonal shape with rounded corners, but it is not particularly limited thereto.

The planar coil may have an outer diameter of 5 cm to 100 cm, 10 cm to 50 cm, 10 cm to 30 cm, 20 cm to 80 cm, or 50 cm to 100 cm. As a specific example, the planar coil may have an outer diameter of 10 cm to 50 cm.

In addition, the planar coil may have an inner diameter of 0.5 cm to 30 cm, 1 cm to 20 cm, or 2 cm to 15 cm.

The number of turns of the planar coil may be 5 to 50 times, 10 to 30 times, 5 to 30 times, 15 to 50 times, or 20 to 50 times. As a specific example, the planar coil may be formed by winding the conductive wire 10 to 30 times.

In addition, the distance between the conductive wires in the planar coil shape may be 0.1 cm to 1 cm, 0.1 cm to 0.5 cm, or 0.5 cm to 1 cm.

Within the preferred dimensions and specification ranges of the planar coil as described above, it can be appropriately used in the fields such as electric vehicles that require large-capacity power transmission.

Shield Unit

The shield unit is disposed on the coil unit.

The shield unit suppresses electromagnetic interference (EMI) that may be generated by leakage of electromagnetic waves to the outside through electromagnetic shielding.

The shield unit may be disposed to be spaced apart from the coil unit by a predetermined interval. For example, the spaced distance between the shield unit and the coil unit may be 10 mm or more or 15 mm or more, specifically, 10 mm to 30 mm or 10 mm to 20 mm.

The material of the shield unit may be, for example, a metal. Thus, the shield unit may be a metal plate, but it is not particularly limited thereto.

As a specific example, the material of the shield unit may be aluminum. Other metals or alloy materials having an electromagnetic wave shielding ability may be used.

The shield unit may have a thickness of 0.2 mm to 10 mm, 0.5 mm to 5 mm, or 1 mm to 3 mm. In addition, the shield unit may have an area of 200 $cm^2$ or more, 400 $cm^2$ or more, or 600 $cm^2$ or more.

Magnetic Unit

The magnetic unit is disposed between the coil unit and the shield unit.

The magnetic unit may be disposed to be spaced apart from the shield unit by a predetermined interval. For example, the spaced distance between the magnetic unit and the shield unit may be 3 mm or more, 5 mm or more, 3 mm to 10 mm, or 4 mm to 7 mm.

In addition, the magnetic unit may be disposed to be spaced apart from the coil unit by a predetermined interval. For example, the spaced distance between the magnetic unit and the coil unit may be 0.2 mm or more, 0.5 mm or more, 0.2 mm to 3 mm, or 0.5 mm to 1.5 mm.

The magnetic unit may be a polymer-type magnetic material comprising a binder resin and a magnetic powder. Alternatively, the magnetic unit may comprise a metallic magnetic material, for example, a nanocrystalline magnetic material. Alternatively, the magnetic unit may be a composite material of the polymer-type magnetic material and the nanocrystalline magnetic material.

Polymer-Type Magnetic Material

The magnetic unit may comprise a polymer-type magnetic material. Specifically, it may comprise a binder resin and a magnetic powder dispersed in the binder resin.

As a result, since the magnetic powder is coupled with each other by the binder resin, the polymer-type magnetic material may have fewer defects over a large area and less damage caused by an impact.

The magnetic powder may be an oxide-based magnetic powder such as ferrite (Ni—Zn-based, Mg—Zn-based, Mn—Zn-based ferrite, and the like); a metallic magnetic powder such as permalloy, sendust, and nanocrystalline magnetic materials; or a mixed powder thereof. More specifically, the magnetic powder may be sendust particles having a Fe—Si—Al alloy composition.

As an example, the magnetic powder may have a composition of the following Formula 1.

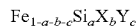
$Fe_{1-a-b-c}Si_aX_bY_c$ [Formula 1]

In the above formula, X is Al, Cr, Ni, Cu, or a combination thereof; Y is Mn, B, Co, Mo, or a combination thereof; $0.01 \leq a \leq 0.2$, $0.01 \leq b \leq 0.1$, and $0 \leq c \leq 0.05$.

The magnetic powder may have an average particle diameter in the range of about 3 nm to 1 mm, about 1 μm to 300 μm, about 1 μm to 50 μm, or about 1 μm to 10 μm.

The polymer-type magnetic material may comprise the magnetic powder in an amount of 50% by weight or more, 70% by weight or more, or 85% by weight or more.

For example, the polymer-type magnetic material may comprise the magnetic powder in an amount of 50% by weight to 99% by weight, 70% by weight to 95% by weight, 70% by weight to 90% by weight, 75% by weight to 90% by weight, 75% by weight to 95% by weight, 80% by weight to 95% by weight, or 80% by weight to 90% by weight.

The binder resin may be a curable resin. Specifically, the binder resin may comprise a photocurable resin, a thermosetting resin, and/or a highly heat-resistant thermoplastic resin. Preferably, it may comprise a thermosetting resin.

A resin, which comprises at least one functional group or moiety that can be cured by heat such as a glycidyl group, an isocyanate group, a hydroxyl group, a carboxyl group, or an amide group; or at least one functional group or moiety that can be cured by active energy such as an epoxide group, a cyclic ether group, a sulfide group, an acetal group, or a lactone group, may be used as the above resin that can be cured to exhibit adhesiveness. Such a functional group or moiety may be, for example, an isocyanate group, a hydroxyl group, or a carboxyl group.

Specifically, examples of the curable resin include a polyurethane resin, an acrylic resin, a polyester resin, an isocyanate resin, or an epoxy resin having at least one functional group or moiety as described above, but it is not limited thereto.

As an example, the binder resin may comprise a polyurethane-based resin, an isocyanate-based curing agent, and an epoxy-based resin.

The polymer-type magnetic material may comprise the binder resin in an amount of 5% by weight to 40% by weight, 5% by weight to 20% by weight, 5% by weight to 15% by weight, or 7% by weight to 15% by weight.

In addition, the polymer-type magnetic material may comprise, based on the weight thereof, 6% by weight to 12% by weight of a polyurethane-based resin, 0.5% by weight to 2% by weight of an isocyanate-based curing agent, and 0.3% by weight to 1.5% by weight of an epoxy-based resin, as the binder resin.

The polymer-type magnetic material may be prepared by a sheet-forming process such as mixing a magnetic powder and a polymer resin composition to form a slurry, then molding it into a sheet shape, and curing it. In order to prepare a polymer-type magnetic material having a large area and a constant thickness, it may be prepared to a block by a molding method using a mold.

A conventional sheet-forming or block-forming method may be applied to the preparation process.

Nanocrystalline Magnetic Material

The magnetic unit may comprise a nanocrystalline magnetic material.

If the nanocrystalline magnetic material is adopted, the higher the distance from the coil unit, the lower the resistance (Rs) even if the inductance (Ls) of the coil unit is lowered, so that the quality factor (Q factor: Ls/Rs) of the coil unit is increased, which may enhance the charging efficiency and reduce the generation of heat.

For example, the nanocrystalline magnetic material may be a Fe-based nanocrystalline magnetic material. Specifically, it may be a Fe—Si—Al-based nanocrystalline magnetic material, a Fe—Si—Cr-based nanocrystalline magnetic material, or a Fe—Si—B—Cu—Nb-based nanocrystalline magnetic material.

More specifically, the nanocrystalline magnetic material may be a Fe—Si—B—Cu—Nb-based nanocrystalline magnetic material. In such a case, Fe may be 70% by element to 85% by element, the sum of Si and B may be 10% by element to 29% by element, and the sum of Cu and Nb may be 1% by element to 5% by element (wherein % by element refers to the percentage of the number of specific elements to the total number of elements). Within the above composition ranges, a Fe—Si—B—Cu—Nb-based alloy can be easily formed into a nanocrystalline magnetic material by thermal treatment.

The nanocrystalline magnetic material is prepared by, for example, a rapid solidification process (RSP) by melt-spinning a Fe-based alloy. It may be prepared by performing a zero-field thermal treatment for 30 minutes to 2 hours in a temperature range of 300° C. to 700° C.

If the thermal treatment temperature is lower than 300° C., nanocrystals are not sufficiently formed, so that the desired magnetic permeability is not obtained, which requires a longer thermal treatment time. If it exceeds 700° C., the magnetic permeability may be significantly lowered by excessive thermal treatment. In addition, when the thermal treatment temperature is low, the treatment time is long. On the other hand, when the thermal treatment temperature is high, the treatment time is preferably shortened.

Meanwhile, it is difficult to make the nanocrystalline magnetic material thick due to the features of the preparation process. For example, it may be formed into a thin sheet having a thickness of 15 μm to 35 μm. Thus, a plurality of such thin-film sheets may be laminated to form a magnetic unit. In such an event, an adhesive layer such as an adhesive tape may be interposed between the thin sheets. In addition, the nanocrystalline magnetic material may be crushed by a pressure roll or the like at the end of the manufacturing process to form a plurality of cracks in the thin sheet, whereby it may be manufactured to comprise a plurality of nanocrystalline fine pieces.

Area and Thickness of the Magnetic Unit

The magnetic unit may be a magnetic sheet, a magnetic sheet laminate, or a magnetic block.

The magnetic unit may have a large area. Specifically, it may have an area of 200 cm² or more, 400 cm² or more, or 600 cm² or more. In addition, the magnetic unit may have an area of 10,000 cm² or less.

The large-area magnetic unit may be configured by combining a plurality of unit magnetic materials. In such an event, the area of the individual unit magnetic materials may be 60 cm² or more, 90 cm², or 95 cm² to 900 cm².

The magnetic sheet may have a thickness of 15 µm or more, 50 µm or more, 80 µm or more, 15 µm to 150 µm, 15 µm to 35 µm, or 85 µm to 150 µm. Such a magnetic sheet may be prepared by a method of preparing a conventional film or sheet.

The magnetic sheet laminate may be one in which 20 or more or 50 or more magnetic sheets are laminated. In addition, the magnetic sheet laminate may be one in which 150 or fewer or 100 or fewer magnetic sheets are laminated.

The magnetic block may have a thickness of 1 mm or more, 2 mm or more, 3 mm or more, or 4 mm or more. In addition, the magnetic block may have a thickness of 6 mm or less.

Magnetic Characteristics of the Magnetic Unit

The magnetic unit may have magnetic characteristics of a certain level in the vicinity of a standard frequency for wireless charging of an electric vehicle.

The standard frequency for wireless charging of an electric vehicle may be less than 100 kHz, for example, 79 kHz to 90 kHz, specifically, 81 kHz to 90 kHz, more specifically, about 85 kHz. It is a band distinct from the frequency applied to mobile electronic devices such as cell phones.

The magnetic permeability of the magnetic unit at a frequency of 85 kHz may vary depending on the material. It may be 5 or more, for example, 5 to 150,000 and may specifically be in the range of 5 to 300, 500 to 3,500, or 10,000 to 150,000, depending on the specific material. In addition, the magnetic permeability loss of the magnetic unit at a frequency of 85 kHz may vary depending on the material. It may be 0 or more, for example, 0 to 50,000 and may specifically be 0 to 1,000, 1 to 100, 100 to 1,000, or 5,000 to 50,000, depending on the specific material.

As an example, if the magnetic unit is a polymer-type magnetic block comprising a magnetic powder and a binder resin, its magnetic permeability may be, for example, 5 to 130, 15 to 80, or 10 to 50, and its magnetic permeability loss may be 0 to 20, 0 to 15, or 0 to 5, at a frequency of 85 kHz.

As another example, if the magnetic unit is a sintered ferrite-based magnetic material, it may have a magnetic permeability of 1,000 to 5,000 or 2,000 to 4,000 and a magnetic permeability loss of 0 to 1,000, 0 to 100, or 0 to 50, at a frequency of 85 kHz.

As still another example, if the magnetic unit is a nanocrystalline magnetic material, it may have a magnetic permeability of 500 to 3,000 or 10,000 to 150,000 and a magnetic permeability loss of 100 to 1,000 or 8,000 to 50,000, at a frequency of 85 kHz.

Characteristics of the Magnetic Unit

As an example, the magnetic unit may comprise a polymer-type magnetic material, and the polymer-type magnetic material may be elongated at a certain ratio. For example, the elongation of the polymer-type magnetic material may be 0.5% or more. The elongation characteristic is difficult to obtain in a ceramic-based magnetic material to which a polymer is not applied. It may reduce damage even if a large-area magnetic unit is distorted by an impact. Specifically, the elongation of the polymer-type magnetic material may be 0.5% or more, 1% or more, or 2.5% or more. There is no particular limitation to the upper limit of the elongation. However, if the content of the polymer resin is increased to enhance the elongation, such characteristics as inductance of the magnetic unit may be deteriorated. Thus, the elongation is preferably 10% or less. Since the magnetic unit is remarkably excellent in impact resistance as compared with conventional sintered ferrite magnetic materials, the wireless charging device comprising the magnetic unit has a small change in characteristics due to an impact.

In the present specification, the rate of change (%) in characteristics before and after an impact may be calculated by the following equation.

$$\text{Rate of change (\%) in characteristic} = |\text{characteristic value before impact} - \text{characteristic value after impact}| / \text{characteristic value before impact} \times 100$$

For example, when an impact is imposed on the magnetic unit as it is subjected to free-falling from a height of 1 m, the wireless charging device comprising the magnetic unit may have a rate of change in inductance of less than 5% or 3% or less before and after the impact. More specifically, the rate of change in inductance may be 0% to 3%, 0.001% to 2%, or 0.01% to 1.5%.

In addition, when an impact is imposed on the magnetic unit as it is subjected to free-falling from a height of 1 m, the wireless charging device comprising the magnetic unit may have a rate of change in Q factor of 0% to 5%, 0.001% to 4%, or 0.01% to 2.5%, before and after the impact.

In addition, when an impact is imposed on the magnetic unit as it is subjected to free-falling from a height of 1 m, the wireless charging device comprising the magnetic unit may have a rate of change in resistance of 0% to 2.8%, 0.001% to 1.8%, or 0.1% to 1.0%, before and after the impact.

In addition, when an impact is imposed on the magnetic unit as it is subjected to free-falling from a height of 1 m, the wireless charging device comprising the magnetic unit may have a rate of change in charging efficiency of 0% to 6.8%, 0.001% to 5.8%, or 0.01% to 3.4%, before and after the impact.

Within the above ranges, the performance of the wireless charging device can be well maintained at a certain level even in an environment where an actual impact or vibration is repeatedly imposed.

Heat Dissipation Unit

The wireless charging device according to an embodiment is provided with a heat dissipation unit adjacent to the magnetic unit or coil unit in which heat is generated, whereby heat can be effectively discharged.

As an example, as shown in FIGS. 2a and 2b, the heat dissipation unit (500) may be disposed between the magnetic unit (300) and the coil unit (200). In such a case, there is an advantage in that heat generated in the magnetic unit and the coil unit can be simultaneously dealt with.

As another example, as shown in FIG. 2c, the heat dissipation unit (500) may be disposed inside the magnetic unit (300). In such a case, there is an advantage in that heat generated inside the magnetic unit can be effectively dealt with.

The structure in which the heat dissipation unit is disposed inside the magnetic unit may be designed in various ways. As an example, once a polymer-type magnetic material has been molded through a mold to have an inner space to which a heat dissipation unit is to be inserted, the heat dissipation unit may be inserted thereto. As another example, a heat dissipation unit may be interposed between a plurality of magnetic sheets, which are then stacked to prepare a magnetic sheet laminate in which the heat dissipation unit is inserted.

The heat dissipation unit may be selectively disposed in a region where heat is generated. For example, as shown in FIG. 2b, the heat dissipation unit (500) may be disposed to correspond to an area in which the coil unit (200) is present. As a result, the heat dissipation unit may effectively enhance the charging efficiency and heat dissipation characteristics even with a smaller area.

The heat dissipation unit may be in direct contact with a region where heat is generated, thereby effectively dissipating heat. Specifically, the heat dissipation unit may be in direct contact with at least one of the magnetic unit and the conductive wire. As an example, as shown in FIGS. 2a to 2c, the heat dissipation unit (500) may be in direct contact with the magnetic unit (300).

Alternatively, the heat dissipation unit may be attached to a region where heat is generated using a thermally conductive adhesive. Specifically, the heat dissipation unit may be attached to the magnetic unit using a thermally conductive adhesive. The thermally conductive adhesive may comprise a thermally conductive material such as a metal-based, carbon-based, or ceramic-based adhesive, for example, an adhesive resin in which thermally conductive particles are dispersed.

The heat dissipation unit may be thermally connected to the shield unit to effectively dissipate heat generated in the magnetic unit or the coil unit to the outside. Specifically, the heat dissipation unit may be connected to the shield unit directly or via a thermally conductive medium.

As an example, as shown in FIGS. 2a to 2c, the heat dissipation unit (500) may be connected to the shield unit (400) via a thermally conductive medium (550). The thermally conductive medium may be composed of the same component as, or a different component from, that of the heat dissipation unit. For example, the thermally conductive medium may be composed of a ceramic material or a carbon-based material. Alternatively, the thermally conductive medium may be composed of the same component as that of the shield unit. For example, it may be composed of aluminum.

Composition of the Heat Dissipation Unit

The heat dissipation unit may comprise a binder resin and insulating inorganic particles dispersed in the binder resin.

Examples of the binder resin include a polyimide resin, a polyamide resin, a polycarbonate resin, an acrylonitrile-butadiene-styrene (ABS) resin, a polypropylene resin, a polyethylene resin, a polystyrene resin, a polyphenylene sulfide (PPS) resin, a polyether ether ketone (PEEK) resin, a silicone resin, an acrylic resin, a polyurethane resin, a polyester resin, an isocyanate resin, and an epoxy resin, but it is not limited thereto.

For example, the binder resin may be a curable resin. Specifically, the binder resin may be a photocurable resin and/or a thermosetting resin. In particular, it may be a resin capable of exhibiting adhesiveness upon curing. More specifically, the binder resin may be a resin comprising at least one functional group or moiety that can be cured by heat such as a glycidyl group, an isocyanate group, a hydroxyl group, a carboxyl group, or an amide group; or at least one functional group or moiety that can be cured by active energy such as an epoxide group, a cyclic ether group, a sulfide group, an acetal group, or a lactone group. Such a functional group or moiety may be, for example, an isocyanate group, a hydroxyl group, or a carboxyl group.

As a specific example, the binder resin may be one or more types of silicone-based resins and acrylic-based resins.

The insulating inorganic particles may comprise a non-carbonous inorganic material. That is, it is preferable that the insulating inorganic particles are not carbon-based fillers such as graphite or carbon nanotubes.

The insulating inorganic particles may comprise ceramic particles. For example, the insulating inorganic particles may comprise a metal oxide or nitride. Specifically, the insulating inorganic particles may comprise at least one selected from the group consisting of silica, alumina, boron nitride, aluminum nitride, and magnesium oxide.

The content of the insulating inorganic particles in the heat dissipation unit may be 70% by weight to 90% by weight, 70% by weight to 85% by weight, or 75% by weight to 90% by weight. If the content of the insulating inorganic particles is within the above preferred ranges, it may be more advantageous from the viewpoint of thermal conductivity.

Characteristics of the Heat Dissipation Unit

The heat dissipation unit may have a sheet shape or a ribbon shape.

The heat dissipation unit may have the same area as, a different area from, that of the magnetic unit. For example, the heat dissipation unit may have the same large area as that of the magnetic unit. Specifically, the heat dissipation unit may have an area of 200 cm$^2$ or more, 400 cm$^2$ or more, or 600 cm$^2$ or more. In addition, the heat dissipation unit may have an area of 10,000 cm$^2$ or less. Alternatively, the heat dissipation unit may have a smaller area than that of the magnetic unit. Specifically, the heat dissipation unit may have an area corresponding to the area of the coil unit.

The heat dissipation unit may have a thickness of 0.1 mm to 10 mm or 1 mm to 5 mm. The heat dissipation unit may have a thickness smaller than the thickness of the magnetic unit. For example, the thickness of the heat dissipation unit may be 1/50 to 1/2, 1/10 to 1/2, or 1/5 to 1/3 of the thickness of the magnetic unit.

The heat dissipation unit has insulation and thermal conductivity.

For example, the heat dissipation unit may have a sheet resistance of $10^4$ Ω/sq or more, specifically, $10^6$ Ω/sq or more. In addition, the heat dissipation unit may have a thermal conductivity of 1 W/m·K or more, specifically, 3 W/m·K or more, more specifically, 3 W/m·K to 30 W/m·K. Specifically, the heat dissipation unit may have a sheet resistance of $10^4$ Ω/sq or more and a thermal conductivity of 1 W/m·K or more. Here, the thermal conductivity may be horizontal thermal conductivity.

Housing

The wireless charging device according to an embodiment may further comprise a housing for accommodating the components described above.

The housing allows such components as the coil unit, the shield unit, and the magnetic unit to be properly disposed and assembled. The material and structure of the housing may be a material and structure of a conventional housing used in a wireless charging device. It may be appropriately designed according to the components adopted therein.

Referring to FIGS. 2a to 2c, the wireless charging device (10) according to an embodiment comprises a housing (600); a coil unit (200) disposed in the housing (600) and comprising a conductive wire; a shield unit (400) disposed on the coil unit (200); a magnetic unit (300) disposed between the coil unit (200) and the shield unit (400); and an insulating heat dissipation unit (500) disposed inside the magnetic unit (300) or between the magnetic unit (300) and the coil unit (200).

Support Unit

The wireless charging device (10) may further comprise a support unit (100) for supporting the coil unit. The material and structure of the support unit may be a material and structure of a conventional support unit used in a wireless charging device. The support unit may have a flat plate structure or a structure in which a groove is formed in compliance with a coil shape to fix the coil unit.

Spacer

In addition, the wireless charging device according to an embodiment may further comprise a spacer for securing a space between the shield unit and the magnetic unit. The material and structure of the spacer may be a material and structure of a conventional spacer used in a wireless charging device.

Electric Vehicle

FIG. 4 shows a transportation means, specifically, an electric vehicle provided with a wireless charging device. Since it is provided with a wireless charging device on its lower side, it may be charged wirelessly in a parking area equipped with a wireless charging system for an electric vehicle.

Referring to FIG. 4, the transportation means (1) according to an embodiment comprises a wireless charging device according to the embodiment as a receiver (21). The wireless charging device may serve as a receiver for wireless charging of the transportation means (1) and may receive power from a transmitter (22) for wireless charging.

The transportation means comprises a wireless charging device, wherein the wireless charging device comprises a housing; a coil unit disposed in the housing and comprising a conductive wire; a shield unit disposed on the coil unit; a magnetic unit disposed between the coil unit and the shield unit; and an insulating heat dissipation unit disposed inside the magnetic unit or between the magnetic unit and the coil unit.

The configuration and characteristics of each component of the wireless charging device adopted in the transportation means are as described above.

The transportation means may further comprise a battery for receiving power from the wireless charging device. The wireless charging device may receive power wirelessly and transmit it to the battery, and the battery may supply power to a driving system of the transportation means. The battery may be charged by power transmitted from the wireless charging device or other additional wired charging devices.

In addition, the transportation means may further comprise a signal transmitter for transmitting information about the charging to the transmitter of the wireless charging system for a transportation means. The information about such charging may be charging efficiency such as charging speed, charging state, and the like.

MODE FOR THE INVENTION

Hereinafter, a preparation example of a magnetic unit used in the wireless charging device according to an embodiment and a test example thereof will be described, but the scope of implementation is not limited thereto.

Preparation Example 1: Preparation of a Magnetic Unit

Step 1: Preparation of a Magnetic Powder Slurry 42.8 parts by weight of a magnetic powder, 15.4 parts by weight of a polyurethane-based resin dispersion (25% by weight of a polyurethane-based resin and 75% by weight of 2-butanone), 1.0 part by weight of an isocyanate-based curing agent dispersion (62% by weight of an isocyanate-based curing agent, 25% by weight of n-butyl acetate, and 13% by weight of 2-butanone), 0.4 part by weight of an epoxy-based resin dispersion (70% by weight of an epoxy-based resin, 3% by weight of n-butyl acetate, 15% by weight of 2-butanone, and 12% by weight of toluene), and 40.5 parts by weight of toluene were mixed in a planetary mixer at a speed of about 40-50 rpm for about 2 hours to prepare a magnetic powder slurry.

Step 2: Preparation of a Magnetic Sheet Laminate

The magnetic powder slurry prepared above was coated onto a carrier film by a comma coater, which was dried at a temperature of about 110° C. to form a polymer-type magnetic material. The polymer-type magnetic material was compression-hardened by a hot press process for about 60 minutes at a temperature of about 170° C. and a pressure of about 9 MPa to obtain a sheet. The content of magnetic powder in the sheet thus prepared was about 90% by weight, and the thickness of a single sheet was about 100 μm. 40 to 50 sheets of the prepared sheet were laminated to obtain a magnetic unit having a thickness of about 4.8 mm.

Comparative Example

A PC-95 ferrite magnetic sheet (thickness: 5 mm) manufactured by TDK Co., Ltd. was used as a comparative example.

Test Example

Tests were carried out in the following manner on the magnetic units of Preparation Example 1 and Comparative Example.

(1) Elongation

The elongation was measured using a UTM device (INSTRON 5982, INSTRON Co., Ltd.) for the sample of the magnetic unit before an impact by the ASTM D412 Type C method.

(2) Change in Characteristics Before and After an Impact

When an impact was imposed on a magnetic unit sample as it was subjected to free-falling from a height of 1 m, the electrical characteristics of the device using the magnetic unit sample before and after the impact were calculated by the following equation.

Rate of change (%) in characteristic=|characteristic value before impact−characteristic value after impact|/characteristic value before impact×100

A coil unit and a frame under the SAE J2954 WPT2 Z2 class standard test specifications were used, and a magnetic unit, a spacer, and an aluminum plate were stacked to prepare a receiving device (35.5 cm×35.5 cm) and a transmitting device (67.48 cm×59.1 cm). The electrical characteristics were measured at a frequency of 85 kHz.

The inductance and resistance were measured using an LCR meter (IM3533, HIOKI).

The quality factor (Q Factor) was calculated as inductance×frequency×2π/resistance.

The charging efficiency was measured under the conditions of an output power of 1,000 W and a frequency of 85 kHz.

The results are shown in Tables 1 and 2 below.

TABLE 1

|  | Impact | Elongation (%) | Inductance (μH) | Quality factor | Resistance (mΩ) | Charging efficiency (%) |
| --- | --- | --- | --- | --- | --- | --- |
| Comparative Example | Before | 0 | 230 | 481 | 263 | 94 |
|  | After | — | 218 | 414 | 290 | 91 |
| Preparation Example 1 | Before | 3 | 225 | 444 | 279 | 93 |
|  | After | — | 225 | 442 | 280 | 93 |

TABLE 2

|  | Elongation (%) | Rate of change in inductance (%) | Rate of change in quality factor (%) | Rate of change in resistance (%) | Rate of change in charging efficiency (%) |
| --- | --- | --- | --- | --- | --- |
| Comparative Example | 0 | 5.2 | 14 | 10.3 | 3 |
| Preparation Example 1 | 3 | 0 | 0.36 | 0.36 | 0 |

As can be seen from the above tables, the magnetic unit of Preparation Example 1 had an elongation of 3%, whereas the ferrite sheet of Comparative Example had an elongation of 0%. In addition, the magnetic unit of Preparation Example 1 was excellent in inductance, quality factor, and resistance of the device using the same before impact, and the rate of change in characteristics after impact was measured in the range of 0 to 1%. In contrast, in the ferrite sheet of Comparative Example, the rate of change in inductance, quality factor, and resistance of the device using the same after impact was measured to be high. In particular, the rate of change (reduction rate) in the charging efficiency was measured as high as 3%. It was confirmed from the above that the magnetic unit of Preparation Example 1 was suitable for a wireless charging device as compared with the conventional ferrite sheet in an environment vulnerable to an impact such as driving of an electric vehicle.

The invention claimed is:

1. A wireless charging device, which comprises a coil unit comprising a conductive wire; a shield unit disposed on the coil unit; a magnetic unit disposed between the coil unit and the shield unit; and an insulating heat dissipation unit disposed inside the magnetic unit, and
   wherein the magnetic unit comprises a binder resin and a magnetic powder dispersed in the binder resin,
   wherein an elongation of the magnetic unit measured by the ASTM D412 Type C method is 0.5% to 10%,
   wherein the insulating heat dissipation unit comprises a binder resin and insulating inorganic particles dispersed in the binder resin, and
   wherein the insulating inorganic particles comprise at least one selected from a group consisting of silica, alumina, boron nitride, aluminum nitride, and magnesium oxide.

2. The wireless charging device of claim 1, wherein the insulating heat dissipation unit has a sheet resistance of $10^4$ Ω/sq or more and a thermal conductivity of 1 W/m·K or more.

3. The wireless charging device of claim 1, wherein the insulating heat dissipation unit is in direct contact with the magnetic unit.

4. The wireless charging device of claim 1, wherein the insulating heat dissipation unit is disposed to correspond to a region in which the coil unit is present.

5. The wireless charging device of claim 1, wherein the insulating heat dissipation unit is connected to the shield unit directly or via a thermally conductive medium.

6. A transportation means, which comprises a wireless charging device, wherein the wireless charging device comprises a housing; a coil unit disposed in the housing and comprising a conductive wire; a shield unit disposed on the coil unit; a magnetic unit disposed between the coil unit and the shield unit; and an insulating heat dissipation unit disposed inside the magnetic unit or between the magnetic unit and the coil unit, and
   wherein the magnetic unit comprises a binder resin and a magnetic powder dispersed in the binder resin,
   wherein an elongation of the magnetic unit measured by the ASTM D412 Type C method is 0.5% to 10%,
   wherein the insulating heat dissipation unit comprises a binder resin and insulating inorganic particles dispersed in the binder resin, and
   wherein the insulating inorganic particles comprise at least one selected from a group consisting of silica, alumina, boron nitride, aluminum nitride, and magnesium oxide.

* * * * *